Feb. 10, 1970  W. S. CRONK  3,494,283
CAVITY FLARE
Filed Dec. 27, 1966
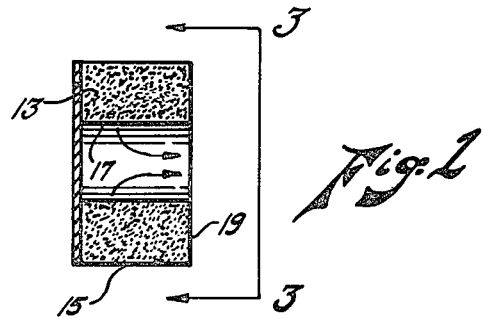
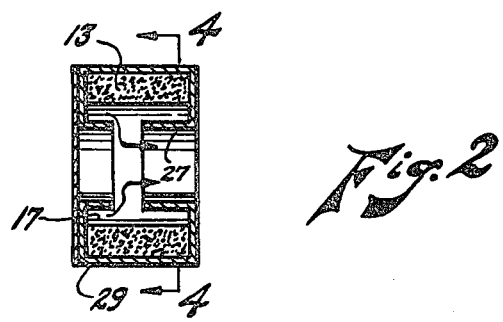
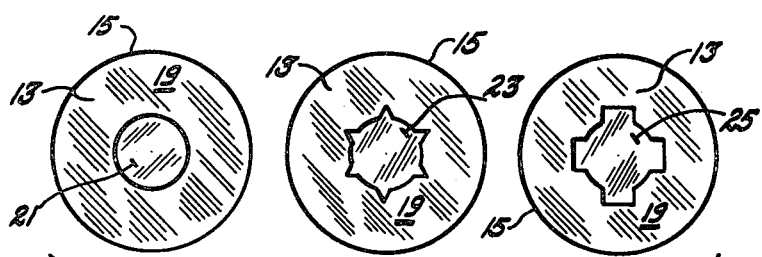
INVENTOR.
WILLIAM S. CRONK
BY Harry A. Herbert Jr.
Arden Tashjian
ATTORNEYS

United States Patent Office 3,494,283
Patented Feb. 10, 1970

3,494,283
CAVITY FLARE
William S. Cronk, Fort Walton Beach, Fla., assignor to the United States of America as represented by the Secretary of the Air Force
Filed Dec. 27, 1966, Ser. No. 605,107
Int. Cl. C06d 1/10
U.S. Cl. 102—37.8
3 Claims This invention relates to a signalling device, and more particularly to a highly efficient high intensity flare having a central cavity in which carbon particles generated by the combustion reaction are heated and can radiate prior to being exposed to the quenching effect of ambient air.

Flare performance is controlled by many factors which affect the intensity and efficiency of the radiation output therefrom. In the general type, which function via radiation emitted from solid particles, such as carbon, the size of the particles formed during the combustion reaction is an important consideration. Since larger particles have higher emittance values, it is desirable to generate relatively large particles. Also, the attainment and maintenance of particle temperatures during the combustion reaction affects the efficiency of the flare. The particles should be sufficiently heated in the combustion area to provide radiation and the heated particles should be permitted to radiate for as long as possible prior to exposure to the quenching effects of the ambient air surrounding the flare.

Another important factor which affects flare performance is the mass and linear burning rate of the flare. High mass burning rates generally provide high flare intensities. However, it has been discovered that, at linear rates above a certain value, flare efficiency is significantly decreased. This is probably caused by the decreased residence time of the carbon particles in the heated reaction zone resulting in the formation of smaller particles which are less effectively heated and more rapidly exposed to quenching air. Furthermore, the increased velocity of reaction products probably increases entrainment of cool air in the radiating plume. Thus, it is seen that high mass burning rates at linear rates below the critical value are desired to provide high efficiency along with the high intensity.

The present invention provides a region where the carbon particles generated by the combustion reaction can be heated and can radiate efficiently before being exposed to the quenching effects of the ambient air. This results in the generation of relatively larger particles having correspondingly higher emittance values. Also, the present invention includes a larger burning surface for the attainment of high mass burning rates at relatively low linear burning rates, thus yielding large particles with superior emittance characteristics.

Accordingly, it is an object of the present invention to provide a high intensity flare having a cavity in the pyrotechnic portion thereof resulting in highly efficient radiation characteristics.

Another object of the invention is to provide a flare having a region wherein the carbon particles generated by the combustion reaction are heated and can radiate efficiently before being exposed to the quenching effect of ambient air.

Still another object of the present invention is to provide a high intensity cavity flare having a large burning surface thereby permitting high mass burning at relatively low linear rates to produce large particles with superior emittance characteristics.

A further object of the invention is to provide a high intensity cavity flare which functions by radiation emitted from solid particles formed during combustion of a pyrotechnic material and which makes provisions for heating the particles thus formed for an unusually long period of time before exposure to the quenching effects of the ambient air surrounding the flare.

A still further object of the invention is to provide a cavity type high efficiency flare wherein the ratio of the length of the flare to the cavity cross-section is not more than about 5 to 1 so that the velocity of the gases through the cavity is kept at a low rate to allow the formation of large particles having high emittance values.

These and other objects, features and advantages will become more apparent after considering the following detailed description taken in conjunction with the annexed drawing and appended claims.

In the drawings, wherein like reference characters refer to like parts in the several views:

FIG. 1 is a longitudinal sectional view of a cavity flare according to the invention;

FIG. 2 is a longitudinal sectional view of a selected embodiment of the invention showing the directional flow of gases and heated particles through the cavity area;

FIG. 3 is a cross-sectional view of the cavity flare taken along the line 3—3 of FIG. 1, showing cavities of various geometric configurations; and FIG. 4 is a cross-sectional view of the cavity flare taken along the line 4—4 of FIG. 2 showing two proposed configurations.

Referring now to the drawings, the novel cavity flares illustrated therein include a solid charge of pyrotechnic material 13 which is generally cylindrical in shape and provided with an internal cavity along its central axis. The embodiment of the cavity flare shown in FIG. 1 is provided with an exterior coating of combustion inhibitor 15. This renders the interior surface 17 of the cavity flare as the major combustion zone. The outer end 19 is also designed to burn along with the internal surface 17 in order to provide radiation characteristics superior to flares which only burn internally. Any pyrotechnic composition 13 which burns to yield solid particles can be utilized with this invention. The cavity flares can be fabricated by conventional techniques.

In FIGURE 3, there is shown some of the various geometrical shapes of the cavity which may be utilized in the practice of the invention as illustrated in FIG. 1. The particular cavity shape chosen is not critical and, as shown, the circular 21, star-shaped 23, cross-shaped 27, or other cavity configurations can be effectively employed. The cavity in the flare provides a region where carbon particles generated by the combustion of the pyrotechnic material are heated and can radiate more efficiently before being exposed to the quenching effect of ambient air.

In the embodiment of the invention shown in FIGURE 2, there is provided a series of baffles 27 which direct the flow of burning carbon particles toward the central axis of the cavity. This arrangement produces particles which are relatively large in size and, therefore, have larger emittance values. Also, more efficient radiation is produced because particles become sufficiently heated and are permitted to radiate for a longer period of time before being exposed to the quenching effect of the ambient air surrounding the flare. Combustion takes place along the interior surface 17 of the flare shown in FIGURE 2 and an outer protective shell 29 is provided to protect the flare from damage and prevent combustion at the outer surface. In FIGURE 4 there is shown two of the geometric varaitions which may be utilized for modifying the inner surface configuration of the flare cavity of the device illustrated in FIG. 2. As previously noted, any convenient shape may be effectively employed in forming the cavity in the pyrotechnic material.

In accordance with the invention, as illustrated by the embodiments hereinbefore described, a high mass burning rate is provided in order to provide a correspondingly high flare intensity. However, the linear burning rate of the flare has been retained at a relatively low value so as not to remove the particles from the combustion zone too quickly. This permits the formation of larger particles which are more effective because of their larger emittance properties. The low linear burning rate also operates to decrease the entrainment of cool air in the radiating plume thus, further adding to the efficiency of the high intensity flare herein disclosed.

According to the invention, the high mass burning rate along with a linear burning rate of less than 0.10 inch/second produces the highly efficient flare having an unexpected increase in radiation intensity. The cavity in the flare provides a region where carbon particles generated by the carbon reaction are heated and can radiate efficiently before being exposed to the quenching effects of ambient air. The ratio of length of the flare to the cavity cross-section should not be greater than about 5:1. At greater ratios, the improved radiation characteristics are not obtained because the velocity of gases through the cavity is so great that large particles having high emittance values are not obtained. The cavity flare herein disclosed is three to four times more efficient in operation than presently known infrared flares and the design provides greatly improved performance in any flare functioning via radiation from solid particles.

Having thus set forth and disclosed the nature of our invention, what we claim and desire to secure by Letters Patent of the United States is:

1. An improved high intensity cylindrical flare comprising an outer cylindrical casing, an elongated cylindrical pyrotechnic charge disposed in said casing for combustion therein, said pyrotechnic charge having an open-ended shaped inner cavity along its central axis, the surface of the inner cavity of said pyrotechnic charge being the source of combustion, a plurality of particles generated from the surface of the inner cavity of said charge during the combustion process, means for delaying the movement of said particles in the cavity for a predetermined time period to allow said particles to be heated and radiate prior to exposure to the quenching effect of ambient air surrounding the flare.

2. The improved high intensity flare defined in claim 1 wherein the means for delaying the movement of said particles in the cavity include a series of baffles positioned in the inner cavity of said pyrotechnic charge, said baffles being spaced from the inner cavity surface so that heated particles in the cavity are conducted radially toward the central axis of said pyrotechnic charge prior to their axial movement in the direction of the open end of said pyrotechnic charge.

3. The improved high intensity cylindrical flare defined in claim 1 wherein the ratio of overall length of said pyrotechnic charge to the cross-section diameter of the inner cavity thereof is less than five to one.

References Cited

UNITED STATES PATENTS

| | | | |
|---|---|---|---|
| 2,481,987 | 9/1949 | Dwyer | 102—37.8 |
| 3,270,668 | 9/1966 | Silver | 102—39 X |

ROBERT F. STAHL, Primary Examiner